United States Patent [19]

Beiswenger

[11] Patent Number: 4,990,901
[45] Date of Patent: * Feb. 5, 1991

[54] LIQUID CRYSTAL DISPLAY TOUCH SCREEN HAVING ELECTRONICS ON ONE SIDE

[75] Inventor: John L. Beiswenger, Salem, Wis.

[73] Assignee: Technomarket, Inc., Buffalo Growe, Ill.

[*] Notice: The portion of the term of this patent subsequent to Jul. 11, 2006 has been disclaimed.

[21] Appl. No.: 283,627

[22] Filed: Dec. 13, 1988

Related U.S. Application Data

[63] Continuation-in-part of Ser. No. 89,138, Aug. 25, 1987, Pat. No. 4,847,666.

[51] Int. Cl.$^5$ .............................................. G09G 3/36
[52] U.S. Cl. .................................... 340/712; 340/784; 340/765; 341/31
[58] Field of Search ............... 340/706, 707, 712, 784, 340/765; 341/31; 250/221; 350/330, 331 R, 332, 345

[56] References Cited

U.S. PATENT DOCUMENTS

| | | | |
|---|---|---|---|
| 4,774,404 | 9/1988 | Hasegawa et al. | 340/712 |
| 4,820,050 | 4/1989 | Griffin | 341/31 |
| 4,837,430 | 6/1989 | Hasegawa | 250/221 |
| 4,847,606 | 7/1989 | Beiswenger | 340/712 |

Primary Examiner—Jeffery A. Brier
Attorney, Agent, or Firm—Kinzer, Plyer, Dorn, McEachran & Jambor

[57] ABSTRACT

An apparatus for providing a control signal utilizes a liquid crystal panel and means for transiently forming transparent windows therein. There is a source of electromagnetic radiation (EMR) adjacent the panel and positioned to pass EMR through transiently open windows. There is an EMR detector positioned adjacent the source and a defined EMR path between the source and detector which path is formed in response to a transiently open window and includes an area for the positioning of an object to occlude the EMR radiation passing between the source and detector. The path also includes a reflector which directs EMR from the source back in the same general direction to the detector. There is a timing and logic circuit correlating the opening of the transient windows and the detection of EMR at said detector to provide a control signal.

18 Claims, 3 Drawing Sheets

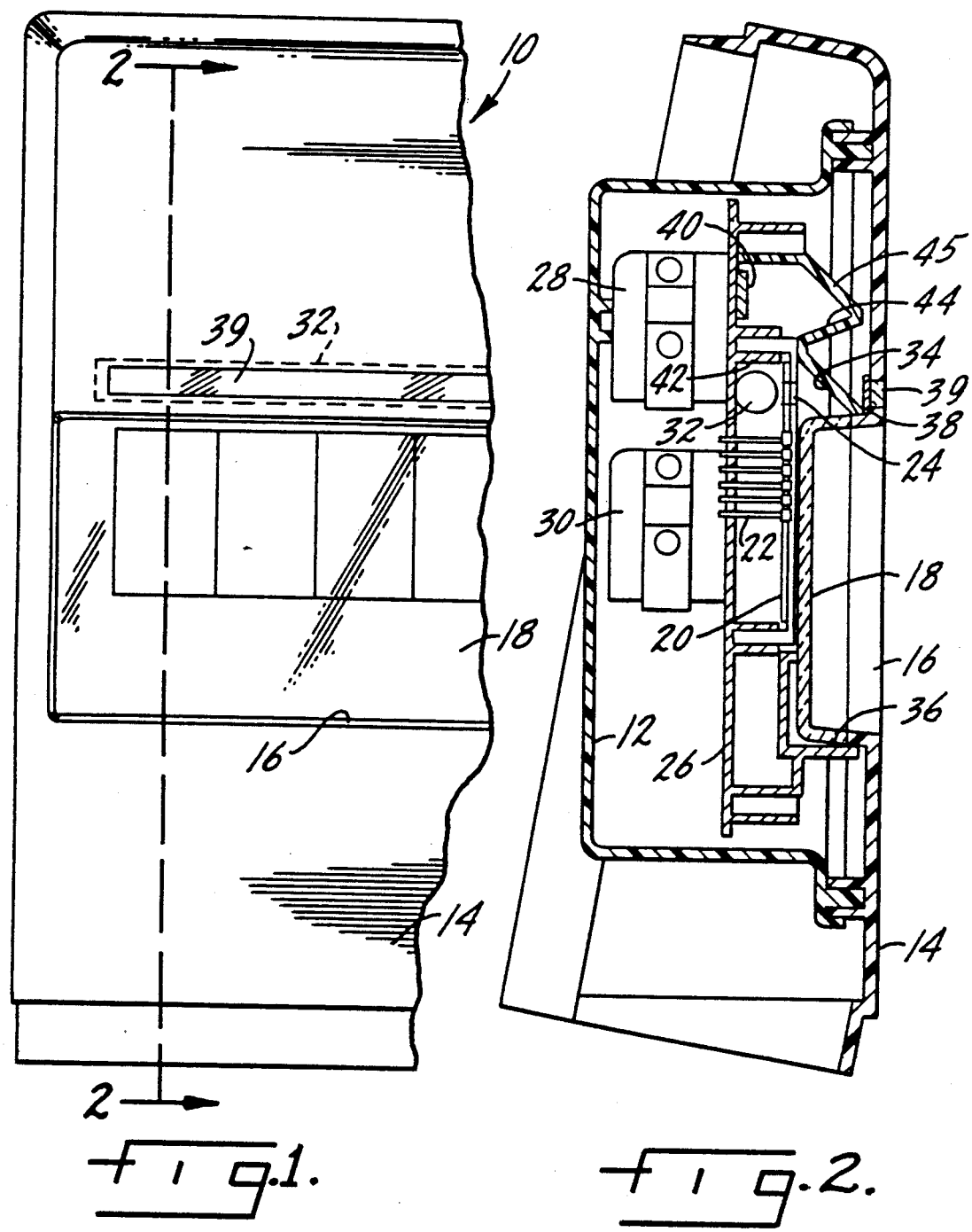

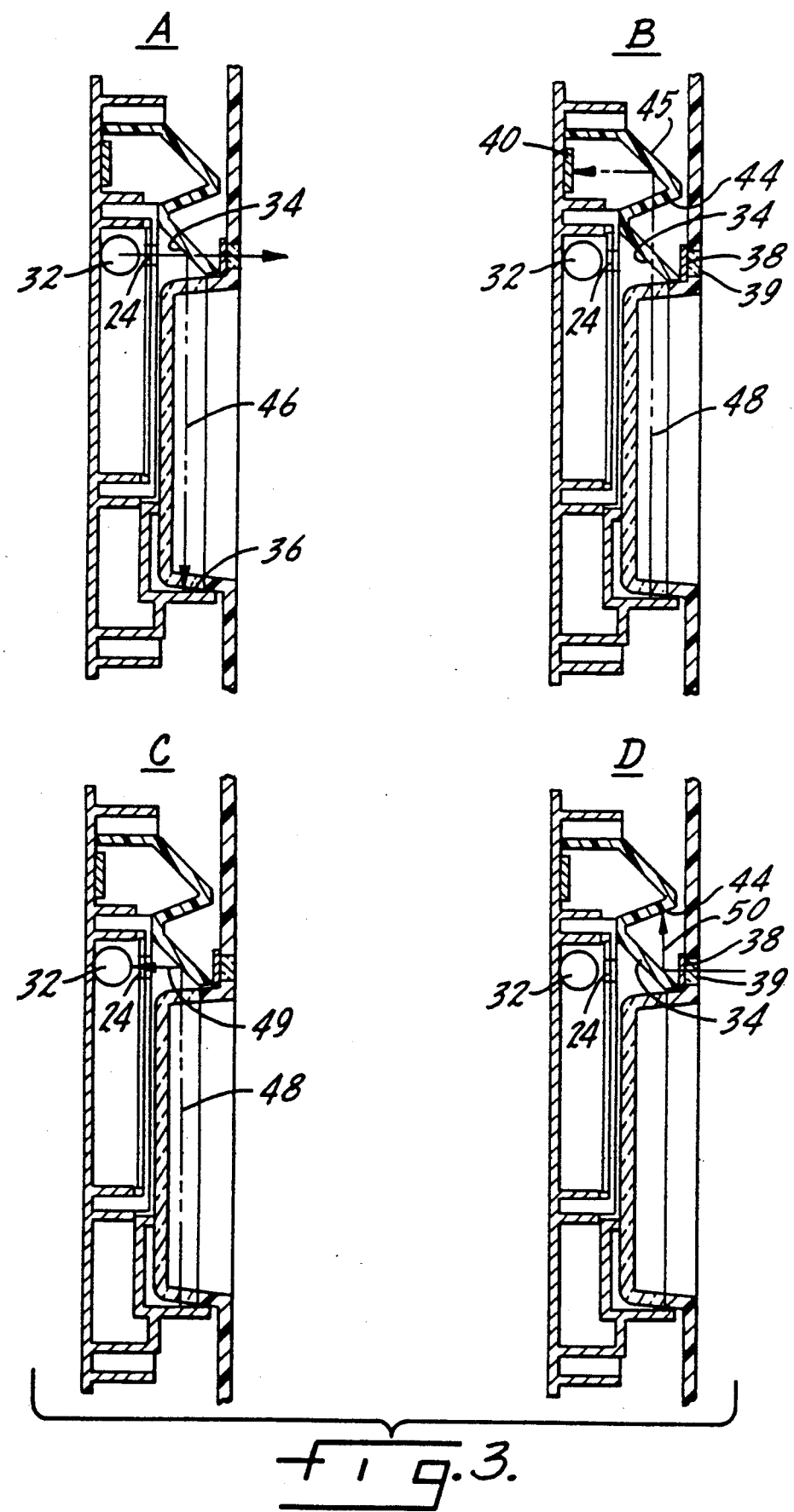

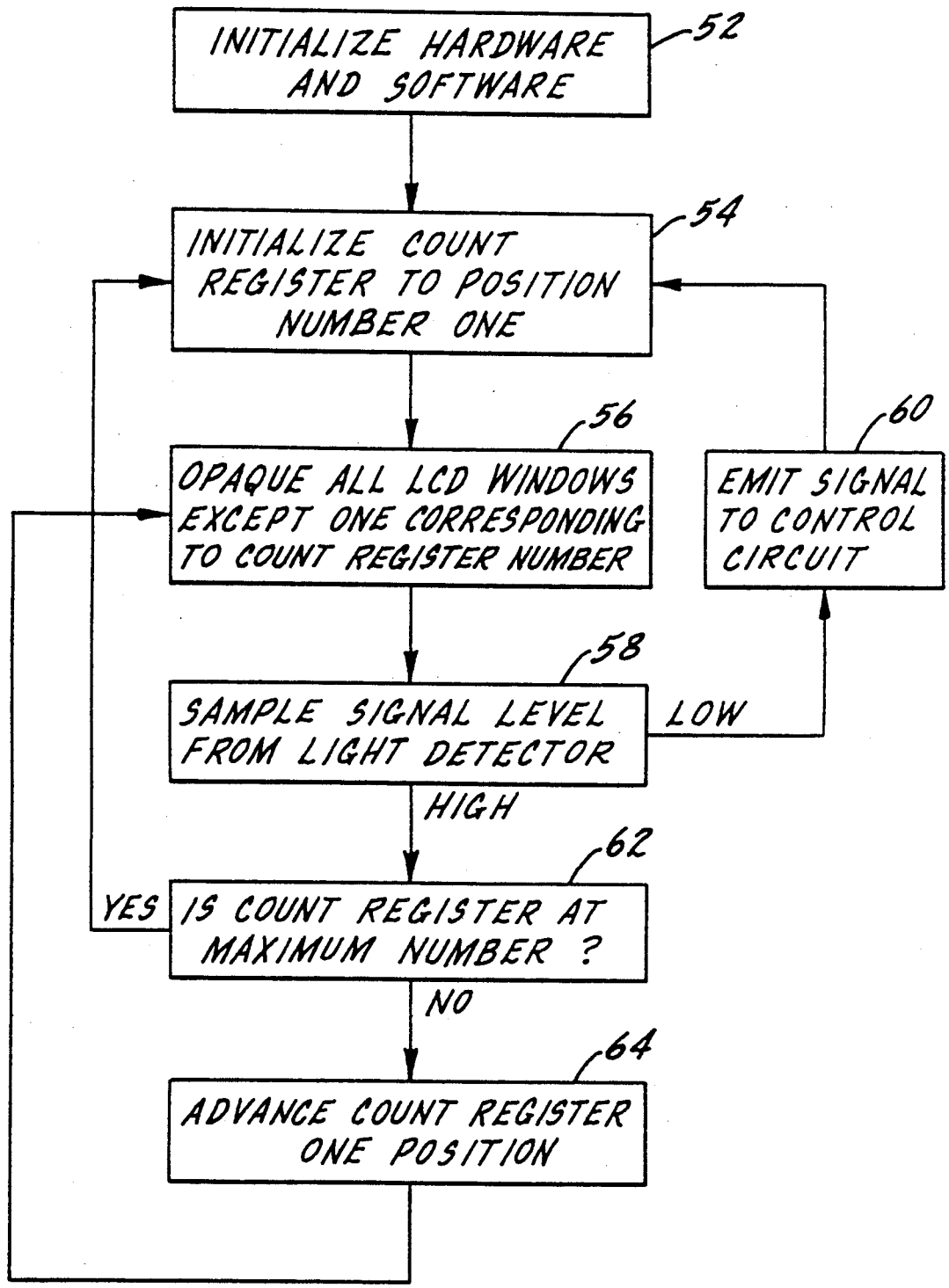

LIQUID CRYSTAL DISPLAY TOUCH SCREEN HAVING ELECTRONICS ON ONE SIDE

This application is a continuation-in-part of application Ser. No. 89,138, filed Aug. 25, 1987 now U.S. Pat. No. 4,847,606 "Control and Display System."

SUMMARY OF THE INVENTION

The present invention relates to electronic control panels and in particular to a control panel which utilizes a liquid crystal display panel to provide an electronic control system of great versatility and flexibility.

There are various types of touch panels now in use and in the prior art. Such panels may rely upon the touch of a finger or an object to initiate a control function and may be of the capacitive, resistive or radiant energy types. The present invention utilizes a liquid crystal display panel in combination with timing and logic circuits which periodically create transparent windows in the liquid crystal panel. The creation of such a window permits light from a source to pass through the window to a detector, with the path including an area in which an occluding object may be present. The timing and logic circuits coordinate the opening of the window and the detection or non-detection of received light at the detector. Although the invention will be described in connection with light, particularly a fluorescent tube, as the source of electromagnetic radiation which passes through the transparent window to the detector, it should be understood that various types of electromagnetic radiation in addition to light in the visible spectrum may be used. The invention differs from that described in the above identified parent application in that both the light source and the light detector are along the same side of the liquid crystal panel, thus substantially simplifying the electronic circuits.

A primary purpose of the invention is to provide a control panel usable in almost an endless variety of applications such as automotive, appliance and the like, in which the positioning of a finger or other object in a path of light initiates a control sequence. The invention is more particularly concerned with placing both the light source and the light detector on the same side of the liquid crystal panel in which there are periodically opened transparent windows so that light from the source may reach the detector. The invention eliminates the need for any moving parts such as conventional switches, eliminates the uncertainty of capacitive type control panels in that no touch is required to initiate a control sequence, only the presence of a finger or other object, for example a punched card, to cause the detector to provide a control function signal.

The invention is illustrated diagrammatically in the following drawings wherein:

FIG. 1 is a partial front view of the control panel disclosed herein,

FIG. 2 is a section along plane 2—2 of FIG. 1,

FIG. 3 is a section, similar to FIG. 2, made up of four views A–D, but illustrating the paths of light both from the source to the detector and from outside the control system housing into the interior thereof, and FIG. 4 is a software flow chart illustrating the functions of the control system disclosed herein.

In the above mentioned co-pending parent application, there is described a control system utilizing a liquid crystal panel in which light from a source passes through transparent windows in the liquid crystal panel to a detector. The light source and the light detector are on opposite sides of the liquid crystal panel. In the present invention, both the light and detector are on the same side of the panel to simplify the electronics in the control system.

In FIGS. 1 and 2, the control system housing is indicated at 10 and may have a rear wall 12 and a front wall 14 having a depressed area 16 defined by an interior wall 18. Positioned directly behind interior wall 18 is a liquid crystal display panel 20 which may be conventional in design and, upon the activation of appropriate electrical circuits through wires 22 will form small transparent windows 24. A microprocessor board 26 is positioned within the housing and connects wires 22 to the microprocessor. Board 26 may also mount suitable relays and timer and logic circuits indicated generally a 28 and 30.

A light source is indicated at 32 and may typically be a fluorescent tube, although any form of electromagnetic radiation whether in the visible spectrum or not may be satisfactory. Light from source 32 will pass through a window 24 in the panel 20 when the window is opened in response to a control signal. Such light will strike a reflective surface or mirror 34 which will deflect only a portion, for example 50%, of the light from source 32 into the recessed area 16 of the housing and down to a retroreflector 36 positioned at the lower side of the recessed area of the housing. A retroreflector is particularly advantageous in that it reflects radiation almost exclusively back in the exact direction of the incident radiation. That portion of light from source 32 which is not reflected by mirror 34, will pass through mirror 34, through a filter 38, which may only pass red light, and then through a transparent portion 39 of front wall 14 of the housing.

The detector is indicated at 40, and is also mounted on PC board 26. The detector is shielded from source 32 by a section of the housing indicated at 42. There is a complete reflective surface or 100% mirror indicated at 45 which will reflect light to the detector and there is a filter indicated at 44 which filters light coming to the detector from the source, and for example such may be a green filter, or one passing only green light. Filters 38 and 44 may not be required in every application and filters passing light of other colors may be satisfactory, providing the colors are complementary.

In operation, the liquid crystal panel 20, unless activated, is opaque and no light will pass therethrough. In one method of operation, windows 24 will be opened in sequence across the panel. The timing and logic circuits will control the opening of the windows and will correlate the opening of the windows with the receipt of light at the detector. If an object is positioned within recess 16 to occlude a particular beam of light passing through a transiently opened window panel 20, the logic and timing circuit will read such occurrence from the amplitude of the light at the detector and can initiate a circuit for a particular control function. The liquid crystal panel may have a display which coincides with the functions which can be performed by the control panel and which provides a visual option of the choices open to the user. The user may first have a minimum number of choices, and after one such choice has been made, the display may change to offer the user a subset of choices and this process may be repeated until the final selection by the user. In the alternative, a machine punched card may be read by the control system disclosed herein as only those areas of the card which have punched openings will permit the passage of from the source to the detector.

FIG. 3 views A-D illustrate the paths of light through the control panel. Light from source 32 passes through an open window 24 and strikes mirror 34. Approximately half or 50% of the light from the source that passes through the window will be reflected downwardly in the path indicated by arrow 46 which path goes through the recessed area of housing 10. Light moving along path 46 will strike retroreflector 36 and will then be directed back up along path 48, which also passes through the recessed area of the housing. Light moving along path 48 will pass through the housing, which is transparent in this area, and approximately half of that light will pass through mirror 34 to filter 44. Approximately half of the light moving upwardly on path 48 will be reflected back on path 49 to light source 32. Light passing through filter 44 will strike mirror 45 and be directed toward detector 40.

Light which is not reflected downwardly by mirror 34 will pass out through the housing but first must pass through red filter 38. This will provide a visual indication to the user that the control system is responding to the positioning of a finger or some other occluding object at a particular area or zone of the liquid crystal display panel.

Housing 10 is essentially opaque except for the areas directly above and below panel 20 so that light from the source may pass through the recessed area 16. The other transparent area of the housing is that area indicated at 39 directly in alignment with red filter 38. This must also be transparent so that light may pass outwardly to give an indication to the user that the control panel has responded to his selection. Ambient light may also pass in through this area of the housing as it is transparent, but such light will first be filtered by red filter 38 and then, will be reflected by mirror 34, as indicated by light path 50 to green filter 44. Since only light in the red spectrum has passed through filter 38 and since that light cannot pass the green filter, ambient light cannot reach the detector.

FIG. 4 illustrates the sequence of steps performed by the software in recognizing the occlusion of a beam of light when a window is open and causing a control signal or control function to be initiated as a result thereof. The initial step 52 is basically to turn on the system and prepare it to function. The next step 54, positions a count register to location No. 1. Step 56 causes all windows 24 to become opaque except for the window which corresponds to the particular count register number, each of the clarifiable windows 24 being assigned a count register number. Next, step 58 samples the signal level from photo detector 40. If the signal level is below a characteristic value, a signal is emitted, as shown by step 60, to the control circuit to cause the system to cycle back to step 54. This process will be repeated as long as the occluding object is present. This will cause a red light to be visible from the exterior of the control panel at the location of the occluding object if the software is designed to delay momentarily at an occluded position. However, if the signal level is at or above a particular value, the next step 62 is to determine if the count register has reached a maximum number. If it has not, the count register advances one position, as indicated at 64 and steps 56 through 62 will be repeated for the next adjacent window in the liquid crystal panel. If, however, the count register has reached the maximum number, the system returns to step 54 to effectively recycle through all window positions of the liquid crystal panel.

The control system as displayed and described is only sufficient to locate a user's choice in any one of a number of available horizontal positions. In order to have a greater number of choices, the control system may be duplicated in a Y axis direction so as to provide a location of the occluding object in both the X and Y axes. This provides a far greater number of control functions for a single display. It should be understood that although the invention has been described as scanning along an X axis, it is equally acceptable to scan along a Y axis, or vertically.

Although the invention has been described as providing transiently open windows adjacent to the light source, the transiently open windows in the liquid crystal panel may be adjacent the detector which would provide a more defined sensitivity as to the exact location of the occluding object and hence the user's choice. To provide further definition to the location of the occluding object, there may be liquid crystal window panels in front of both the source and the detector, with transparent windows being opened simultaneously in the same linear location to permit light beam transmission.

The disclosure of the present invention which places both the light source and the light detector along the same side of the liquid crystal display panel may be used with many of the embodiments described in my above mentioned co-pending application Ser. No. 89,138 of which this application is a continuation-in-part.

Whereas the preferred form of the invention has been shown and described herein, it should be realized that there are many modifications, substitutions and alterations thereto.

The embodiments of the invention in which an exclusive property or privilege is claimed are defined as follows:

1. An apparatus for providing a control signal including a liquid crystal panel and means for transiently forming transparent windows therein, a source of electromagnetic radiation (EMR) adjacent said panel and positioned to pass EMR through transiently open windows, an EMR detector positioned adjacent said source, a defined EMR path between said source and detector, which path is formed in response to a transiently open window, said path including an area for positioning an object to occlude said EMR, and also including reflective means which directs EMR from said source back in the same general direction to said detector, and timing and logic means correlating the opening of said transient windows and the detection of EMR at said detector to provide a control signal.

2. The apparatus of claim 1 further characterized in that said apparatus includes a housing for said panel, source and detector, with said source and detector being adjacent one side of said panel and said reflective means being adjacent an opposite side of said panel.

3. The apparatus of claim 2 further characterized in that said EMR path is in part outside of said housing.

4. The apparatus of claim 3 further characterized in that said EMR path is, in part, outside of said housing between said source and said reflective means and is, in part, outside of said housing between said reflective means and said detector.

5. The apparatus of claim 2 further characterized in that said EMR is visible light.

6. The apparatus of claim 5 further characterized in that said light path includes a mirror which reflects only a portion of said light, with the non-reflected portion passing through the mirror and being visible outside of said housing.

7. The apparatus of claim 6 further characterized by and including a light filter positioned to filter the non-reflected portion of the light which passes through said mirror, with said filter passing light of a particular color.

8. The apparatus of claim 7 further characterized by and including a second filter passing light of a color different from that of said first light filter, said second filter preventing that portion of ambient light which passes said first filter from reaching said detector.

9. The apparatus of claim 1 further characterized in that said reflective means is a retroreflector.

10. The apparatus of claim 1 further characterized in that said transiently formed windows are positioned directly in front of said EMR source.

11. The apparatus of claim 1 further characterized by and including means for preventing ambient light from reaching said detector.

12. An apparatus for providing a control signal including a housing, a liquid crystal panel in said housing and means for transiently forming transparent windows therein, a light source in said housing, along one side of said panel and positioned adjacent said windows, a light detector adjacent and shielded from said light source, a light path between said source and detector, said path including a retroreflector along the side of said panel opposite said source, said path, in part, being outside of said housing to provide for the occlusion of light in said light path, and timing and logic means correlating the opening of said transient windows and detection of light at said detector to provide a control signal.

13. The apparatus of claim 12 further characterized by and including a recessed display area, substantially coextensive with said panel, said light path passing through said recessed display area to permit a light path occluding object to be positioned therein.

14. The apparatus of claim 13 further characterized in that said light source and light detector are positioned along the same side of said panel.

15. The apparatus of claim 13 further characterized bY and including reflector means positioned to deflect a portion of the light from said source into the recessed display area and toward said retroreflector, that portion of the light from said source which is not reflected by said reflecting means passing through said housing.

16. The apparatus of claim 15 further characterized in that light from said retroreflector passes through said reflecting means to reach said detector.

17. The apparatus of claim 16 further characterized by and including means for preventing ambient light from passing through said housing into said detector.

18. The apparatus of claim 17 further characterized in that said means for preventing ambient light from reaching said detector includes spaced light filters, each passing light of a different color.

* * * * *